(12) United States Patent
Matsui (10) Patent No.: US 9,699,340 B2
(45) Date of Patent: Jul. 4, 2017

(54) IMAGE READING DEVICE (71) Applicant: KYOCERA Document Solutions Inc., Osaka (JP)

(72) Inventor: Shinya Matsui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/007,761

(22) Filed: Jan. 27, 2016

(65) Prior Publication Data

US 2016/0227063 A1 Aug. 4, 2016

(30) Foreign Application Priority Data

Jan. 29, 2015 (JP) ................. 2015-015557

(51) Int. Cl.
*H04N 1/00* (2006.01)
(52) U.S. Cl.
CPC ..... *H04N 1/00803* (2013.01); *H04N 1/00551* (2013.01); *H04N 1/00689* (2013.01); *H04N 1/00737* (2013.01)
(58) Field of Classification Search
CPC .................................. H04N 1/00803
See application file for complete search history.

(56) References Cited

U.S. PATENT DOCUMENTS

| 7,969,622 | B2 | 6/2011 | Saika |
| 2011/0043874 | A1 | 2/2011 | Saika |

FOREIGN PATENT DOCUMENTS

| JP | 2006-197268 | * | 7/2006 |
| JP | 2006-197268 A | | 7/2006 |
| JP | 2013-093693 | * | 10/2011 |
| JP | 2013-093693 A | | 5/2013 |
| WO | 2010/125693 A1 | | 11/2010 |

OTHER PUBLICATIONS

An Office Action; "Notice of Reasons for Rejection," issued by the Japanese Patent Office on Oct. 25, 2016, which corresponds to Japanese Patent Application No. 2015-015557 and is related to U.S. Appl. No. 15/007,761.

* cited by examiner

*Primary Examiner* — Ibrahim Siddo
(74) *Attorney, Agent, or Firm* — Studebaker & Brackett PC (57) ABSTRACT

An image reading device includes contact glass, a frame, a light emitting section, a sensor, and a control section. An original document is placed on the contact glass. The flame surrounds the periphery of the contact glass. The light emitting section emits light toward the contact glass and the frame. The sensor detects a first received light amount resulting from first reflected light that has passed through the contact glass and a second received light amount resulting from second reflected light that has been reflected off the frame. The control section compares temporal variation of the first received light amount with temporal variation of the second received light amount. The control section determines whether or not the temporal variation of the first received light amount indicates presence of the original document on the contact glass using the temporal variation of the second received light amount as a reference.

20 Claims, 4 Drawing Sheets

IMAGE READING DEVICE

INCORPORATION BY REFERENCE

The present application claims priority under 35 U.S.C. §119 to Japanese Patent Application No. 2015-015557, filed on Jan. 29, 2015. The contents of this application are incorporated herein by reference in their entirety.

BACKGROUND

The present disclosure relates to an image reading device.

A generic image reading device detects a size of an original document placed on a document table thereof before reading an image of the original document. The image reading device includes a light source. The light source irradiates the document table with light before a cover of the image reading device is closed toward the document table. In a position of the original document on the document table, the light emitted by the light source is reflected off the original document and becomes incident on an imaging element. In a position without the original document, on the other hand, the light emitted by the light source passes through and out of the document table. The position of the original document is therefore detected by detecting the light received by the imaging element. A size of the original document is detected based on the position of the original document.

However, ambient such as light from a fluorescent lamp may fall on the document table before the cover is closed. That is, the imaging element may receive such ambient light. In such a situation, the position of the original document is detected based on the ambient light received by the imaging element. As a result, the image reading device may erroneously detect the size of the original document.

In order to deal with the problem, an image reading device varies the emission intensity of light that is emitted by a light source therein so that the resulting temporal variation is different from the temporal variation of the emission intensity of ambient light. When the temporal variation of the amount of light received by the imaging element is consistent with the temporal variation of the amount of light emitted by the light source, therefore, it is determined that an original document is present on the document table, and the position of the original document is detected. The size of the original document is then detected based on the position of the original document.

SUMMARY

An image reading device according to an aspect of the present disclosure includes contact glass, a frame, a light emitting section, a mirror, a sensor, and a control section. An original document is placed on the contact glass. The frame surrounds the periphery of the contact glass. The light emitting section emits light toward the contact glass and the frame. The sensor receives first reflected light that has passed through the contact glass and then reflected off the mirror, and second reflected light that has been reflected off the frame and then reflected off the mirror. The sensor detects a first received light amount resulting from the first reflected light and a second received light amount resulting from the second reflected light. The control section compares temporal variation of the first received light amount with temporal variation of the second received light amount. The control section determines whether or not the temporal variation of the first received light amount indicates presence of the original document on the contact glass using the temporal variation of the second received light amount as a reference.

DETAILED DESCRIPTION

An embodiment of the present disclosure will be described with reference to the accompanying drawings. Note that the embodiment described below does not limit the disclosure according to the scope of the claims.

Figure 1A:
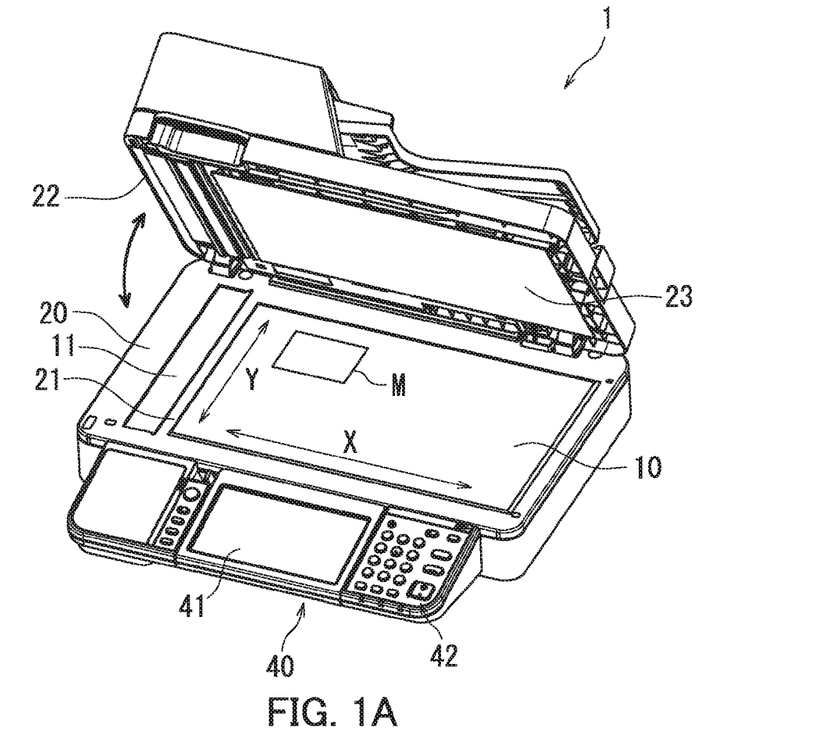
FIG. 1A is a perspective view illustrating an image reading device according to an embodiment of the present disclosure.
Figure 1B:
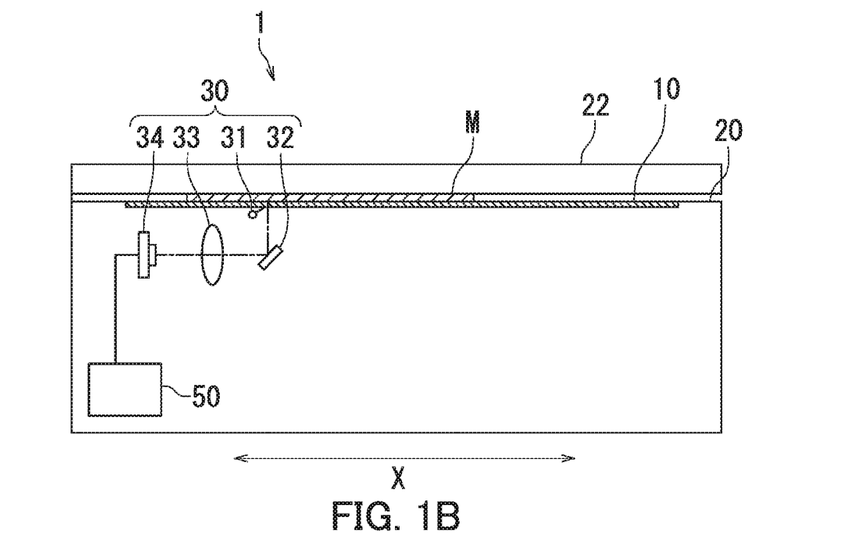
FIG. 1B is a side view illustrating the image reading device according to the embodiment of the present disclosure.

An image reading device 1 includes contact glass 10, feeder document contact glass 11, a frame 20, a document cover 22, an imaging section 30, an operation section 40, and a control section 50 (FIGS. 1A and 1B).

An original document M is placed on the contact glass 10 in the present embodiment. The frame 20 surrounds the periphery of the contact glass 10. The frame 20 includes a support plate 21. The support plate 21 will be described later.

The imaging section 30 is disposed under the contact glass 10. The imaging section 30 moves in a sub-scanning direction. The sub-scanning direction is a direction parallel to an X direction in FIGS. 1A and 1B. A main scanning direction is a direction parallel to a Y direction in FIG. 1A. The sub-scanning direction is perpendicular to the main scanning direction. The imaging section 30 includes a light emitting section 31, a mirror 32, a lens 33, and a sensor 34.

The light emitting section 31 has a plurality of light emitting elements. The light emitting section 31 emits light toward the contact glass 10 and the frame 20 from below. In a situation in which the original document M is present at a position to which the light emitting section 31 emits light, the light is reflected off the original document M. The light reflected off the original document M passes through the contact glass 10 and reaches the mirror 32. After reaching the mirror 32, the light is reflected off the mirror 32, passes through the lens 33, and reaches the sensor 34. In a situation in which the original document M is absent at a position to which the light emitting section 31 emits light, the light passes upward through and out of the contact glass 10. Light reflected off the frame 20 reaches the mirror 32 and then reaches the sensor 34 as in the light that passes through the contact glass 10.

The sensor 34 detects the amount of the reflected light that has reached the sensor 34, that is, the amount of received light. The sensor 34 performs the detection in the main scanning direction for scanning the original document M on a line-by-line basis. The amount of received light is an analog signal. The amount of received light that has been detected is for example converted from an analog signal into a digital signal by an analog front end (AFE). After the conversion into a digital signal, resulting data (a pixel value) representing the amount of received light is input into the control section 50.

The document cover 22 is mounted so as to be openable and closable relative to the contact glass 10. The image reading device 1 is capable of reading an image of an original document M fed by the automatic document feeder. The image of the original document M fed by the automatic document feeder is read through the feeder document contact glass 11. The feeder document contact glass 11 is disposed adjacent to the contact glass 10 with the support plate 21 therebetween. The frame 20 further surrounds the periphery of the feeder document contact glass 11.

Figure 2:
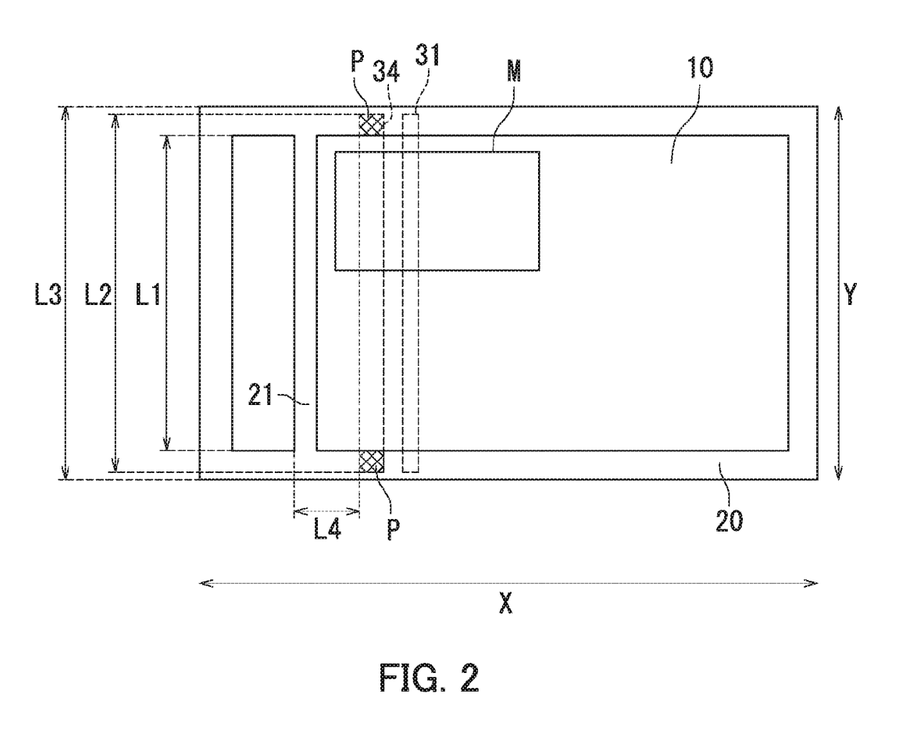
FIG. 2 is a plan view illustrating contact glass and a frame according to the embodiment of the present disclosure.

The operation section 40 includes a display 41 and an input section 42. FIG. 2 is a plan view illustrating the contact glass 10 and the frame 20. FIG. 2 is a top view of the contact glass 10 and the frame 20. A length L2 of the light emitting section 31 in the main scanning direction is longer than a length L1 of the contact glass 10 in the main scanning direction. The length L2 of the light emitting section 31 in the main scanning direction is shorter than a length L3 of the frame 20 in the main scanning direction.

Each end of the light emitting section 31 extending in the main scanning direction is located outside of the contact glass 10. The respective ends of the light emitting section 31 are opposed to a pair of regions P that are portions of the frame 20 and that are opposite to one another in the main scanning direction outside the contact glass 10. The light emitting section 31 can therefore simultaneously irradiate each line along the main scanning direction including a region of the contact glass 10 ranging from one end to the other end thereof and a pair of regions P.

The sensor 34 receives first reflected light that has passed through the contact glass 10 and then reflected off the mirror 32. The sensor 34 then detects a first received light amount resulting from the first reflected light. The sensor 34 also receives second reflected light that has been reflected off the pair of regions P of the frame 20 and then reflected off the mirror 32. The sensor 34 then detects a second received light amount resulting from the second reflected light.

Next, operation of the imaging section 30 will be described with reference to FIGS. 1A, 1B, and 2. The image reading device 1 includes a first switch and a second switch (not shown). Each of the first switch and the second switch is for example provided on the frame 20 at a location close to the attachment of the document cover 22. The first switch detects whether or not the document cover 22 is being closed. The second switch detects whether or not the document cover 22 is closed.

Upon the first switch detecting that the document cover 22 is being closed, the image reading device 1 of the present embodiment determines whether an original document M placed on the automatic document feeder is to be read or an original document M placed on the contact glass 10 is to be read. For example, in a situation in which an original document M is detected on the automatic document feeder, the image reading device 1 of the present embodiment determines that the original document M fed by the automatic document feeder is to be read. On the other hand, in a situation in which no original document M is detected on the automatic document feeder, the image reading device 1 determines that the original document M placed on the contact glass 10 is to be read.

Upon determining that the original document M placed on the contact glass 10 is to be read, the image reading device 1 of the present embodiment detects the size of the original document M. The size of the original document M is detected after the first switch has detected that the document cover 22 is being closed and before the second switch detects that the document cover 22 is closed.

The imaging section 30 is in a predetermined standby position while on standby. Being on standby refers to a state in which the imaging section 30 is not reading an image of an original document M. In the present embodiment, the standby position of the imaging section 30 is a position where one end of the sensor 34 is a distance L4 apart from one end of the support plate 21 in the sub-scanning direction. For reading an image of an original document M placed on the contact glass 10, the imaging section 30 detects the size of the original document M in the standby position.

The size of the original document M is a size selected by a user as appropriate. In a configuration in which the standby position of the imaging section 30 is closer to the support plate 21, the imaging section 30 can detect an original document M having a smaller dimension in the sub-scanning direction. In a configuration in which the standby position of the imaging section 30 is farther from the support plate 21, a reduction in driving force of a motor for moving the imaging section 30 in the sub-scanning direction can be held smaller. Therefore, the distance L4 from the one end of the sensor 34 to the one end of the support plate 21 is preferably 5 cm to 10 cm.

For detecting the size of the original document M, the light emitting section 31 first irradiates the contact glass 10 at a lower surface thereof and the frame 20 at the pair of regions P with light at the same time. After the light emitting section 31 starts emitting light, the amount of the light emitted by the light emitting section 31 increases with time and becomes constant after the elapse of a specific period of time.

In a position of the original document M on the contact glass 10, the light emitted by the light emitting section 31 is reflected off the original document M. The first reflected light that has been reflected off the original document M passes through the contact glass 10 and reaches the mirror 32. The first reflected light that has reached the mirror 32 is reflected off the mirror 32, passes through the lens 33, and is received by the sensor 34. The sensor 34 keeps detecting the first received light amount resulting from the first reflected light until a predetermined period of time has passed. That is, the sensor 34 detects temporal variation of the first received light amount between the start of the irradiation by the light emitting section 31 and the elapse of the predetermined period of time.

In a position without the original document M, the light emitted by the light source 31 passes upward through and out of the contact glass 10. However, since the document cover 22 is not closed, that is, since the document cover 22 is open relative to the contact glass 10, ambient light may pass through the contact glass 10 and reach the mirror 32. The sensor 34 may therefore receive the ambient light as first reflected light and detect temporal variation of a first received light amount resulting from the ambient light as well.

The first received light amount resulting from e ambient light varies in a lighting cycle of the ambient light. In a situation in which the ambient light is light from a fluorescent lamp in a room in which the image reading device 1 is placed, for example, the first received light amount varies in the lighting cycle of the fluorescent lamp. The amount of light emitted by the fluorescent lamp varies in a specific cycle because an alternating-current voltage is applied to the fluorescent lamp. As a result, the first received light amount resulting from the ambient light varies in the specific cycle.

In positions of the pair of regions P, the light emitted by the light emitting section 31 is reflected off a lower surface of the frame 20. The second reflected light that has been reflected off the lower surface of the frame 20 is guided by the mirror 32 to pass through the lens 33 and is received by the sensor 34. The sensor 34 keeps detecting the second received light amount resulting from the second reflected light until a predetermined period of time has passed. That is, the sensor 34 detects temporal variation of the second received light amount between the start of the irradiation by the light emitting section 31 and the elapse of the predetermined period of time as well. In order to detect temporal variation of the amount of the ambient light coming from the fluorescent lamp, the sensor 34 detects the first received light amount and the second received light amount for a longer period of time than the lighting cycle of the fluorescent lamp. That is, the predetermined period of time is longer than the lighting cycle of the fluorescent lamp.

The frame 20 is light-blocking and fixed. The first received light amount resulting from the first reflected light that has been reflected off the original document M and that has passed through the contact glass 10, and the second received light amount resulting from the second reflected light that has been reflected off the frame 20 vary in substantially the same manner. As a result, the frame 20 can be regarded as the original document M placed on the contact glass 10. Consequently, whether or not the temporal variation of the first received light amount indicates the presence of the original document M on the contact glass 10 is determined using the temporal variation of the second received light amount as a reference.

The first received light amount and the second received light amount are analog signals. The first received light amount, which is an analog signal, is converted into a first pixel value, which is a digital signal, by the AFE. The second received light amount, which is an analog signal, is converted into a second pixel value, which is a digital signal, by the AFE. Data representing temporal variation of the first pixel value and data representing temporal variation of the second pixel value are input into the control section 50. That is, the temporal variation of the first pixel value corresponds to the temporal variation of the first received light amount. The temporal variation of the second pixel value corresponds to the temporal variation of the second received light amount.

The control section 50 compares the data representing the temporal variation of the first pixel value with the data representing the temporal variation of the second pixel value. The control section 50 then determines whether or not the data representing the temporal variation of the first pixel value indicates the presence of the original document M using the data representing the temporal variation of the second pixel value as a reference. The control section 50 detects the position of the original document M based on the first pixel value determined to be indicating the presence of the original document M and detects the size of the original document M based on the position of the original document M.

According to the present embodiment, the temporal variation of the first received light amount is compared with the second received light amount, and whether or not the temporal variation of the first received light amount indicates the presence of the original document M is determined using the temporal variation of the second received light amount as a reference. The accuracy of the determination of the presence of the document M is thus improved, and the accuracy of the detection of the position of the original document M is improved. Consequently, the accuracy of the detection of the size of the original document M is improved.

According to the present embodiment, the first received light amount resulting from light that has passed through the contact glass 10 and the second received light amount resulting from the second reflected light from the frame 20 are detected. Accordingly, whether or not the temporal variation of the first received light amount indicates the presence of the original document M on the contact glass 10 is determined using the temporal variation of the second received light amount as a reference. Consequently, the accuracy of the detection of the size of the original document M can be improved with a simple configuration. For example, whether or not the first received light amount results from ambient light is determined with a configuration that does not require a driver for varying the amount of light emitted by the light emitting section 31 in a specific cycle.

Figure 3:
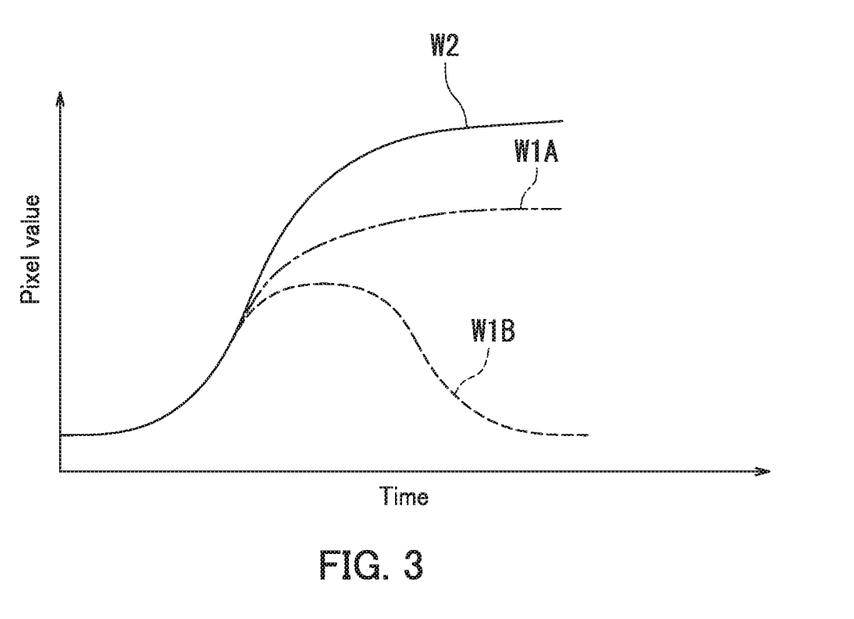
FIG. 3 is a diagram illustrating temporal variation of first pixel values and temporal variation of a second pixel value according to the embodiment of the present disclosure.

Next, temporal variation of a first pixel value W1A, temporal variation of a first pixel value W1B, and temporal variation of a second pixel value W2 that are used for comparison to be performed by the control section 50 will be described with reference to FIG. 3. The vertical axis represents pixel value. The horizontal axis represents time of light emission by the light emitting section 31. In FIG. 3, the temporal variation of the first pixel value W1A is represented by a dashed-dotted line, the temporal variation of the first pixel value W1B is represented by a dashed line, and the temporal variation of the second pixel value W2 is represented by a solid line.

The second pixel value W2 gradually increases with time after the start of the light emission by the light emitting section 31. The second pixel value W2 becomes constant after the elapse of a specific period of time. The temporal variation of the second pixel value W2 represents temporal variation of the second received light amount resulting from the second reflected light that has been reflected off the lower surface of the frame 20 and detected by the sensor 34. Using the temporal variation of the second pixel value W2 as a reference, therefore, the control section 50 determines whether or not the temporal variation of the first pixel value W1A indicates the presence of the original document M and whether or not the temporal variation of the first pixel value W1B indicates the presence of the original document M.

The first pixel value W1A represents the first received light amount resulting from the first reflected light that has been reflected off the original document M, has passed through the contact glass 10, and has been detected by the sensor 34. Like the second pixel value W2, the first pixel value W1A gradually increases with time after the start of the light emission by the light emitting section 31. Besides, like the second pixel value W2, the first pixel value W1A becomes constant after the elapse of a specific period of time. The control section 50 therefore determines that the temporal variation of the first pixel value W1A is substantially consistent with the temporal variation of the second pixel value W2. As a result, the control section 50 determines that the temporal variation of the first pixel value W1A indicates the presence of the original document M. Note that a difference between the second pixel value W2 and the first pixel value W1 after the elapse of the specific period of time from the start of the light emission by the light emitting section 31 corresponds to a difference between a luminance value of the frame 20 and a luminance value of the original document M.

On the other hand, the first pixel value W1B corresponds to a first received light amount resulting from light that has passed through the contact glass 10 without having been reflected off the original document M and has been detected by the sensor 34. Like the second pixel value W2, the first pixel value W1B gradually increases with time after the start of the light emission by the light emitting section 31.

However, the first pixel value W1B decreases after the elapse of the specific period of time from the start of the light emission by the light emitting section 31. That is, the first pixel value W1B varies in a specific cycle. In the present embodiment, the temporal variation of the first pixel value W1B represents temporal variation of ambient light in a lighting cycle thereof. Upon the sensor 34 detecting the first pixel value W1B varying in the specific cycle, therefore, the control section 50 determines that the temporal variation of the first pixel value W1B is not consistent with the temporal variation of the second pixel value W2. As a result, the control section 50 determines that the temporal variation of the first pixel value W1B does not indicate the presence of the original document M.

According to the present embodiment, it is determined that the temporal variation of the first pixel value W1A indicates the presence of the original document M based on the determination that the temporal variation of the first pixel value W1A corresponding to the first received light amount is substantially consistent with the temporal variation of the second pixel value W2 corresponding to the second received light mount. Accordingly, the position of the original document M can be detected using the temporal variation of the second pixel value W2 as a reference. Consequently, the size of the original document M is detected based on the position of the original document M.

According to the present embodiment, it is determined that the temporal variation of the first received light amount does not indicate the presence of the original document M based on the determination that the temporal variation of the first pixel value W1B corresponding to the first received light amount is not consistent with the temporal variation of the second pixel value W2. When the sensor 34 receives ambient light, therefore, it is determined that the temporal variation of the first received light amount does not indicate the presence of the original document M. It is therefore possible to prevent the size of the original document M from being erroneously detected due to the ambient light.

Figure 4:
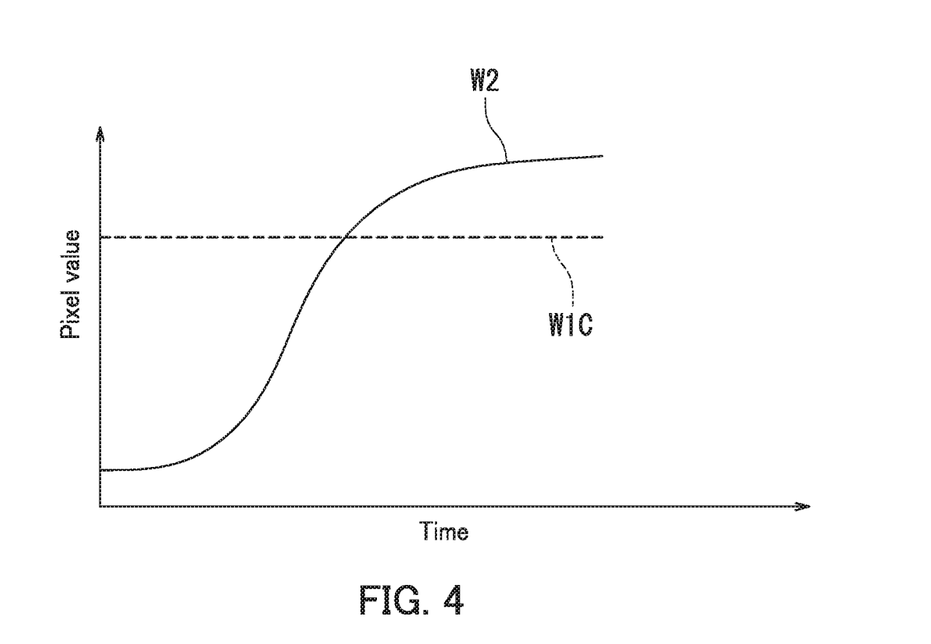
FIG. 4 is a diagram illustrating temporal variation of another first pixel value and temporal variation of the second pixel value according to the embodiment of the present disclosure.

FIG. 4 shows temporal variation of the first pixel value W1C and temporal variation of the second pixel value W2. The vertical axis represents pixel value. The horizontal axis represents time of light emission by the light emitting section 31. In FIG. 4, the temporal variation of the first pixel value W1C is represented by a dashed line, and the temporal variation of the second pixel value W2 is represented by a solid line. The temporal variation of the second pixel value W2 is as described with reference to FIG. 3, and therefore the description is not repeated.

The first pixel value W1C corresponds to a first received light amount resulting from light that has passed through the contact glass 10 without having been reflected off the original document M and has been detected by the sensor 34. The first pixel value W1C at the time the light emitting section 31 starts emitting light is greater than the second pixel value W2. That is, the first pixel value W1C indicates that light being emitted at the time the light emitting section 31 starts emitting light has been detected by the sensor 34. Upon the sensor 34 detecting the first pixel value W1C that is greater than the second pixel value W2 at the time the light emitting section 31 starts emitting light, therefore, the control section 50 determines that the temporal variation of the first pixel value W1C is not consistent with the temporal variation of the second pixel value W2. As a result, the control section 50 determines that the temporal variation of the first pixel value W1C does not indicate the presence of the original document M.

Note that the first pixel value W1C is constant regardless of the time of the light emission by the light emitting section 31. That is, the first pixel value W1C does not vary in a specific cycle. This means that the first received light amount corresponding to the first pixel value W1C results from light emitted by a light source to which a direct-current voltage is applied. The light source to which a direct-current voltage is applied is for example an inverter.

The first received light amount that does not vary in a specific cycle may result from sunlight. The control section 50 can therefore detect sunlight as ambient light even if the image reading device 1 is placed at a location that allows sunlight to enter the contact glass 10. Consequently, the accuracy of the detection of the size of the original document M is further improved.

Next, operation of the imaging section 30 for reading an image of the original document M will be described with reference to FIGS. 1A, 1B, and 2. When the second switch detects that the document cover 22 is closed, the imaging section 30 moves to a position right under the support plate 21. The support plate 21 functions as a white reference member. The white reference member is a member for generating white reference data for shading correction. The shading correction is performed to correct non-uniform sensitivity of the sensor 34, non-uniform amount of light emitted by the light emitting section 13, and non-uniform imaging by the lens 33 that images reflected light.

Upon a user operating the operation section 40 to start reading of an image of an original document M, the imaging section 30 reads the image of the original document M while moving in the sub-scanning direction. A range of the movement of the imaging section 30 in the sub-scanning direction corresponds to the size of the original document M that is detected. In a situation in which the image reading device 1 is to read an image of an original document M placed on the automatic document feeder, the imaging section 30 moves to a position right under the feeder document contact glass 11.

A white plate 23 is attached to a lower surface of the document cover 22. Without an original document M, the light emitted by the light source 31 passes through the contact glass 10 and is reflected off the white plate 23 while the document cover is closed relative to the contact glass 10. The light reflected off the white plate 23 is reflected off the mirror 32, passes through the lens 33, and is received by the sensor 34. The sensor 34 receives substantially the same amount of reflected light as the light emitted by the light emitting section 31. Upon the sensor 34 receiving substantially the same amount of reflected light as the light emitted by the light emitting section 31, the control section 50 determines the absence of an original document M.

According to the present embodiment, the size of an original document M is detected before reading of an image of the original document M. The image reading device 1 can therefore predetermine a range of the movement of the imaging section 30 in the sub-scanning direction for reading the image of the original document M. As a result, power to be consumed by the movement of the imaging section 30 can be reduced.

According to the present embodiment, the size of the original document M is detected before reading of the image of the original document M. The image reading device 1 can therefore determine a range of activation of the light emitting section 31 and the sensor 34 in the main scanning direction for reading the image of the original document M. As a result, power to be consumed by the activation of the light emitting section 31 and the sensor 34 can be reduced.

The present disclosure is not limited to the above embodiment and may be implemented in various different forms that do not deviate from the essence of the present disclosure (for example, as described below in sections (1) and (2)). The drawings schematically illustrate elements of configuration in order to facilitate understanding. Properties of the elements of configuration illustrated in the drawings such as thickness, length, and quantity may differ from reality in order to aid preparation of the drawings. Furthermore, properties of the elements of configuration described in the above embodiment, such as shapes and dimensions, are merely examples and are not intended as specific limitations. Various alterations may be made so long as there is no substantial deviation from the effects of the present disclosure.

(1) The imaging section 30 includes a single mirror 32 as described with reference to FIGS. 1A and 1B. Alternatively, the imaging section 30 may include a plurality of mirrors 32.

(2) The image reading device 1 may be for example an image forming apparatus. According to this variation, the size of the original document M is detected before the reading of the image of the original document M. The image forming apparatus can therefore pre-select a sheet on which an image is to be formed. Consequently, the time of image formation on the sheet can be reduced.

What is claimed is:

1. An image reading device comprising:
contact glass on which an original document is placed;
a frame surrounding a periphery of the contact glass;
a light emitting section configured to emit light toward the contact glass and the frame;
a mirror;
a sensor configured to receive first reflected light that has passed through the contact glass and then reflected off the mirror, and second reflected light that has been reflected off the frame and then reflected off the mirror, and detect a first received light amount resulting from the first reflected light and a second received light amount resulting from the second reflected light;
a control section configured to compare temporal variation of the first received light amount with temporal variation of the second received light amount;
a document cover mounted so as to be openable and closable relative to the contact glass;
a first switch configured to detect whether or not the document cover is being closed relative to the contact glass; and
a second switch configured to detect whether or not the document cover is closed relative to the contact glass,
wherein the control section determines whether or not the temporal variation of the first received light amount indicates presence of the original document on the contact glass using the temporal variation of the second received light amount as a reference, and
the control section compares the temporal variation of the first received light amount with the temporal variation of the second received light amount after the first switch has detected that the document cover is being closed and before the second switch detects that the document cover is closed.

2. The image reading device according to claim 1, wherein
a length of the light emitting section in a main scanning direction is longer than a length of the contact glass in the main scanning direction and shorter than a length of the frame in the main scanning direction.

3. The image reading device according to claim 1, wherein
upon determining that the temporal variation of the first received light amount is substantially consistent with the temporal variation of the second received light amount, the control section determines that the temporal variation of the first received light amount indicates the presence of the original document.

4. The image reading device according to claim 1, wherein
upon the sensor detecting the first received light amount that varies in a specific cycle, the control section determines that the temporal variation of the first received light amount does not indicate the presence of the original document.

5. The image reading device according to claim 1, wherein
upon the sensor detecting the first received light amount that is greater than the second received light amount at the time the light emitting section starts emitting light, the control section determines that the temporal variation of the first received light amount does not indicate the presence of the original document.

6. The image reading device according to claim 1, wherein
the light emitting section irradiates the contact glass at a lower surface thereof and the frame at a pair of regions thereof with light at the same time.

7. The image reading device according to claim 2, wherein
upon determining that the temporal variation of the first received light amount is substantially consistent with the temporal variation of the second received light amount, the control section determines that the temporal variation of the first received light amount indicates the presence of the original document.

8. The image reading device according to claim 2, wherein
upon the sensor detecting the first received light amount that varies in a specific cycle, the control section determines that the temporal variation of the first received light amount does not indicate the presence of the original document.

9. The image reading device according to claim 2, wherein
upon the sensor detecting the first received light amount that is greater than the second received light amount at the time the light emitting section starts emitting light, the control section determines that the temporal variation of the first received light amount does not indicate the presence of the original document.

10. The image reading device according to claim 2, wherein
the light emitting section irradiates the contact glass at a lower surface thereof and the frame at a pair of regions thereof with light at the same time.

11. The image reading device according to claim 7, wherein
upon the sensor detecting the first received light amount that varies in a specific cycle, the control section determines that the temporal variation of the first received light amount does not indicate the presence of the original document.

12. The image reading device according to claim 7, wherein
upon the sensor detecting the first received light amount that is greater than the second received light amount at the time the light emitting section starts emitting light, the control section determines that the temporal variation of the first received light amount does not indicate the presence of the original document.

13. The image reading device according to claim 7, wherein
the light emitting section irradiates the contact glass at a lower surface thereof and the frame at a pair of regions thereof with light at the same time.

14. The image reading device according to claim 11, wherein
upon the sensor detecting the first received light amount that is greater than the second received light amount at the time the light emitting section starts emitting light, the control section determines that the temporal variation of the first received light amount does not indicate the presence of the original document.

15. The image reading device according to claim 11, wherein
the light emitting section irradiates the contact glass at a lower surface thereof and the frame at a pair of regions thereof with light at the same time.

16. The image reading device according to claim 14, wherein
the light emitting section irradiates the contact glass at a lower surface thereof and the frame at a pair of regions thereof with light at the same time.

17. The image reading device according to claim 12, wherein
the light emitting section irradiates the contact glass at a lower surface thereof and the frame at a pair of regions thereof with light at the same time.

18. The image reading device according to claim 3, wherein
upon the sensor detecting the first received light amount that varies in a specific cycle, the control section determines that the temporal variation of the first received light amount does not indicate the presence of the original document.

19. The image reading device according to claim 3, wherein
upon the sensor detecting the first received light amount that is greater than the second received light amount at the time the light emitting section starts emitting light, the control section determines that the temporal variation of the first received light amount does not indicate the presence of the original document.

20. The image reading device according to claim 3, wherein
the light emitting section irradiates the contact glass at a lower surface thereof and the frame at a pair of regions thereof with light at the same time.

* * * * *